United States Patent [19]

Nixon et al.

[11] Patent Number: 4,841,441
[45] Date of Patent: Jun. 20, 1989

[54] METHOD OF CREATING A COMPUTER SYSTEM

[75] Inventors: Rodger J. Nixon; Peter J. C. Roselli; David I. Armstrong; Martin K. Lindley; Imogen E. de la Bere, all of Christchurch, New Zealand

[73] Assignee: Adata Software Limited, Christchurch, New Zealand

[21] Appl. No.: 761,748

[22] Filed: Aug. 1, 1985

[30] Foreign Application Priority Data

Aug. 1, 1984 [NZ] New Zealand .................. 209070
Mar. 29, 1985 [NZ] New Zealand .................. 211641

[51] Int. Cl.⁴ .................................. G06F 15/40
[52] U.S. Cl. .................................. 364/401; 364/513; 364/300
[58] Field of Search ............... 364/513, 401, 300, 900, 364/400

[56] References Cited

U.S. PATENT DOCUMENTS 4,656,603  4/1987  Dunn .......................... 340/721 X Primary Examiner—Jerry Smith
Assistant Examiner—Charles B. Meyer
Attorney, Agent, or Firm—Christie, Parker & Hale

[57] ABSTRACT

An expert system uses internal rules for sound software development and in the end automatically produces a correct running system, without the need for the designer to work out the solution first or to enter any more than the facts (data types and procedure types) of the organization. To operate the user merely inputs data about the organization in response to prompts in the form of conversational language questions. The rest of the development of the software for that organization is actually done by the expert system itself.

26 Claims, 4 Drawing Sheets

METHOD OF CREATING A COMPUTER SYSTEM

FIELD OF THE INVENTION

This invention relates to producing computer systems. Embodiments are concerned with data processing methods and methods of analysis and design of application software.

BACKGROUND OF THE INVENTION

Conventionally, the creation of computer systems has involved the steps of (a) an analysis of requirements, (b) designing a system, (c) writing a program and then (d) testing. Both the steps of analysis and systems design are completely manual steps and necessitate the use of skilled personnel. Collectively steps (a) and (b) are responsible for the major portion of the costs for the development of computer systems which are born by large size organizations. This can also be viewed as follows ( a second view):

The stages in the creation of software for an organisation follow a well recognized pattern. They are:
1. An analyst analyzes the data provided by the customer organization culminating in the written preparation of system specifications.
2. Design of the application software and preparation of program specifications for operating the organization.
3. Program personnel write programs based on the specifications which collectively achieve control of the operating procedures of the organization.
4. Program personnel test the individual programs and the analyst tests if they fit together to achieve control.

All stages are manual and tedious and consequently, they represent a large proportion of the cost of customized software. A relatively simple organization might take a team of analysts several months to complete stages 1 and 2. The complexity of committing the data to paper specifications and then converting the specifications to readable source code is considerable but as each potential user usually has a unique organization in that each has different data and individual operating techniques and accompanying procedures, there is thought to be a limit to the extent to which these tasks can be simplified for the purposes of classification.

The values within the data are interrelated but the way in which they are interrelated tends to be highly specific to the organization for example, a product servicing department in one company may service the product, issue invoices for the servicing work they do but that might be all that it has in common with the corresponding department in a competitive company.

SUMMARY OF THE INVENTION

It is an object of the present invention to provide a method of creating a computer system which substitutes the machine for a systems analyst whom is responsible for the aforesaid step (a). A further object of the present invention is to make the aforesaid steps (b) and (c) automatic and to substantially eliminate step (d).

Further objects and advantages of the present invention will become apparent from the ensuing description which is given by way of example.

According to the present invention there is provided a method of creating a computer system comprising storing in the main memory of the computer information in the form of expertise on how to design, build and maintain a computer system so that the user can communicate to the computer system the facts about his organization and the computer system he requires using ordinary conversational language with the end result that the user is provided with an individually tailored system to suit his needs.

The information stored in the memory of the computer is information prepared by experts in developing computer systems.

The user information stored in the computer is capable of being modified as a result of instructions to and-/or responses from the user, that is, the computer creates a model of the user's environment and his computer systems and checks any new information against that model to ensure the facts are consistent with the facts stored in the model.

System modifications are all automatically integrated with the rest of the system.

The present invention is a computer system which is knowledge based. It possesses the knowledge of human experts in the field of computer technology.

When the user is asked a question in conversational language by his computer programmed in accordance with the present invention, the answer comes from his knowledge of his own business or activity.

Thus a computer programmed in accordance with the present invention has its own built-in quality control, the system eliminates errors and the system guarantees total integration permanently. The computer acts in the role of system analyst and the user responds to the computer as if he, the user, were responding to a human expert.

Referring to the second view given above:

This invention provides a method of constructing a data model of an organisational structure and the operation thereof comprising conducting the stages of analysis and procedure design for a data model on a data processing machine.

More particularly this method provides a method of constructing a data model of an organizational structure for a user, and a systems model for the computer systems which are used by the organization, utilising a digital or analog computer system comprising:
 (a) storing in a main memory of a computer system, a source series of questions which are presentable to a user in conversational language regarding the entities concerned in the organizational structure, the attributes of those entities, the relationships between those entities,
 (b) storing in the main or auxiliary memory in coded form, answers to the questions provided by the user which answers constitute the model of the organization and its systems,
 (c) progressively comparing the coded form of each answer with coded answers in response to earlier questions,
 (d) analyzing the comparisons and establishing by the comparisons which data are eligible for incorporation into the model.

These steps constitute the stages of synthesizing the data and procedure model. The user then takes the further step of running the model without any programming or compiling.

If the analysis of the comparisons reveals that data offered for input is inconsistent with data already accepted, an appropriate series of questions is put to the user in order to resolve the inconsistency.

"Conversation language" refers to natural language as opposed to machine or computer language. Other aspects of the invention are claimed in the claims appended hereto.

The present invention provides method and means for producing a computer system, and the system so produced. The means, for example, may be embodied as software stored in means to co-operate with a computer to enable the computer to produce a computer system or may be embodied as software in a computer enabling the computer to produce a computer system. The method consists in applying the software to a particular organization. The organisation will usually be a business enterprise and require for example control of stock, personnel, accounts and wages. However, the organization may be, or include, for example a complex manufacturing process, especially one which is non-linear, eg: making and testing pharmaceutical drugs, or food, fractional distillation of oil products, tailoring clothes. Again, the organization may be a Government department.

The invention is to be distinguished from so-called tailoring systems which take an existing computer system for use in operating an organization, the format of the system already being laid down, and simply adapt it for a particular organization. The embodiments described herein of the present invention present systems analyst questions to elicit data and required procedures and produce a format interrelating these for use in operating the organization concerned.

DESCRIPTION OF THE DRAWINGS

FIG. 1A shows in schematic form on the one hand the known stages necessary in constituting a model, and on the other hand the method stage of the invention. An analyst constructs a model with the assistance of the user which the analyst refines by testing, modifying and retesting. Thus the analyst proceeds from *Development System* to *System Model* in a number of stages depending upon the complexity of the model. In this invention the user proceeds directly to form a systems model and to run the same.

DESCRIPTION OF EMBODIMENT

Figure 1A:
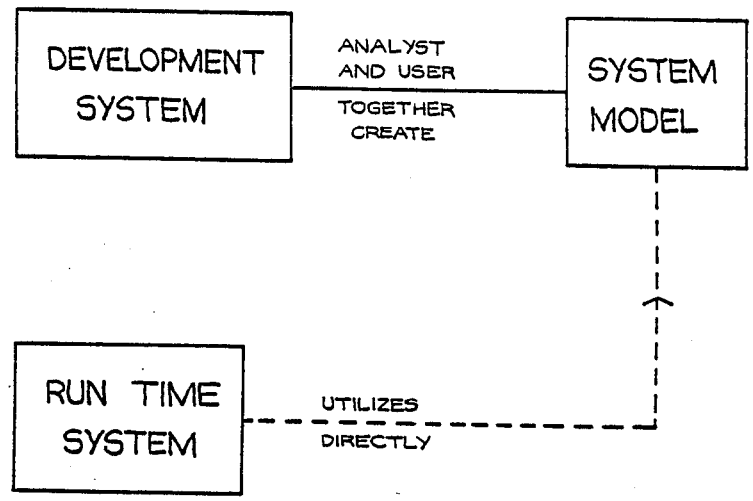
FIGS. 1A, 1B and 2 illustrate by way of example embodiments of the invention.

Initially the system seeks to establish the entities concerned in an organizational structure and then to identify the entities consistently by reference to their attributes whereafter questions are posed concerning the relationships between the entities.

The following description is divided into sections. Section 1 is a descriptive overview written as to a System Designer of a particular embodiment allotted the trademark EXSYS. Section 2 is a more detailed view of various procedures illustrating particular features of EXSYS. Section 3 is a more formal overview with more detailed specifics, definitions and examples.

SECTION 1

EXSYS is an "EXPERT SYSTEM". This term is not a casual description but a technical term for a specific type of computer system. It is defined in the Dictionary of Computer Terms as "a Computer System that possesses the collective knowledge of Human Experts in a given field and can perform the function of those experts".

WHAT IS EXSYS?

EXSYS is an Expert System that possesses the know-how to design and create high quality applications software. It possesses the knowledge because it starts out with a (completely general) skeletal system, and has been programmed to obtain information from a user in order to "add flesh to the bones" of an ideal computer system for that user's application. Currently, the development of applications software involves four steps—Analysis, Design, Programming and Testing. The first two of the steps are manual ones, very time-consuming and expensive.

What EXSYS does is use the pre-programmed skill it has been given to act as an analyst and designer, performing the functions of a human system analyst, therefore acting as an analyst's tool. In the process, it automatically creates the "programs" (the third step), which are therefore efficient and bug-free.

EXSYS gathers facts about the user's organization by asking questions in conversational language. Where answers require further investigation, more questions are asked. The user answers the questions in plain, concise language.

Having gathered these facts, EXSYS designs and programs a system that is tailored for the organization.

EXSYS development replaces the four-step process with a one-step process. The simple technique of bringing the computer in at the beginning of the development process (replacing all subsequent processes) achieves considerable increases in speed and development, improves the quality of the product, and dramatically decreases the cost of development.

More significant even than this is the effect EXSYS has on the costs of maintenance, or the cost associated with obtaining new benefits.

With all alternative methods, the cost per benefit rises over time as systems progressively lose integration. This happens because the ramifications of change are often beyond the capacity of people to comprehend. EXSYS, on the other hand, is always aware of all the implications of any change. That knowledge builds up over time, and so the cost per benefit decreases over time.

EXSYS is a totally integrated product, with extensive security and recovery facilities for the full relational database that it creates.

Development of systems using EXSYS does not require people with extensive training in Data Processing. It was developed for use by people with business management and organizational skills, such as Business Administration graduates referred to below as Designers.

THE COMPONENTS OF EXSYS

There are two basic and separate modules in EXSYS:
EXSYS Design
EXSYS Run-time

Depending on the System you have bought, there may also be special modules for "stand-alone" Report Writing, and/or a module for making ad hoc Queries using natural language. English. All integrated EXSYS systems have, as a minimum, a Design module and a Run-Time module. The only exception is a system used for Data Modelling alone.

The ways in which various users access these modules depends on the method of installation. This in turn depends on the wishes of the person in charge for the system (to be called the System Administrator).

These ways will almost certainly be different to those which may be seen in an uninstalled (demonstration) system.

The EXSYS Design module enables the system design team to create and modify a Data Model of the Organization's environment, and to create and modify Procedures which act on data stored according to that Data Model, so that end users can use the system.

The EXSYS Run-Time module is that part of EXSYS which the end users—the storemen, secretaries, terminal operators, salesmen, managers—actually see and use. After part or all of the system has been designed, the Run-time module contains menus which lead to Procedures which have been designed.

A somewhat simplistic, but nevertheless helpful, viewpoint is that, when you receive your EXSYS software, it contains a skeleton Run-time system with no content, details or rules. It is the task of the designers to develop the details and rules, so that the end user can operate a filled-out system which operates according to the Model that has been defined.

But EXSYS does not leave the designer "in the dark", to work out the detail alone. It is programmed to know what types of details are required, so that once the design starts the shape of the whole rapidly becomes clear.

EXSYS is designed to enable easy modification of developing AND "live" systems. Whilst a live system is being used by end users, the designers can be modifying a copy of the Data and/or Procedure Models, so that when the changes are complete, the new Models can go directly into use by the Run-time module.

This can be done because the Run-time system interprets the current Models, to find out what to do.

Whilst it may be feared that this could create chaos, EXSYS is so engineered that ALL changes are fully integrated. The resultant Model is internally unified and non-contradictory. EXSYS will either maintain this status, or inform the designer of actions which must be taken to restore full integrity.

Because of this, your EXSYS system can grow as your organization and its activities grow.

EXSYS TERMINOLOGY

Careful steps have been taken to limit the number of technical terms used in EXSYS Design to an absolute minimum. As a result, there are three very important terms to be used, together with a handful of rather minor ones.

The important terms are:
ENTITY
ATTRIBUTE
RELATIONSHIP

Entities are the "things" in the environment of the Business or Organisation, about which you want to store information. For example, Customer, Product, Department, Invoice.

Attributes are properties of Entities, each of which has a part to play in the description of that Entity. For example, Customer Name, Customer Age, Product Unit Price, Invoice Date.

Relationships describe the ways in which Entities interact, or are structurally related, in the Organisations activities. For example, Customer buys Product, Branch manages Department.

GETTING STARTED

You may have special instructions for installation and initialization. Normally, all that is required is to
log on
get yourself into the appropriate directory
type EXSYS.

EXSYS will detect that you have no existing Data Model, and will spend a short time (usually less than a minute) creating a blank Model. It will then take you directly into the EXSYS Design module.

EXSYS DESIGN

This is the area which, after initializing the Data and Procedure Models, will be used most by you, the System Designer, for some time.

It involves
defining and detailing the Data Model
partitioning that Model into workable areas
designing and detailing of Procedures.
It contains the following activities:
Data Modelling
Attribute Detailing
Procedure Overview
Procedure Modelling
Conditions and Formulae
Menu Design.

(It may help, in this introductory material, to take the viewpoint that EXSYS develops two Models—a Data Model and a Procedure Model. While this is loosely correct, the two Models are highly interdependent, and many system details (such as Menu details) do not obviously lie within either. In fact EXSYS develops the answers given into a combined Model which carries out the functions of a Data Model and of a Procedure Model and other functions which will become apparent.

DATA MODELLING

Data Modelling is principally concerned with:
naming and identifying the Entities of the organization,
naming the Attributes of those Entities, and
describing the Relationships between the Entities.

It is NOT used to define any details beyond names and methods of identification. In particular, data types are not considered, nor are the Procedures which will eventually use these Entities and Attributes.

The way in which EXSYS works (asking questions, re-wording them for further consideration where necessary, and offering intelligent defaults) will help you arrive at a sufficient understanding. Because it is an Expert System, it has the knowledge base to be able to understand your uncertainties and steer you through them.

Your initial task is to tell EXSYS about the Entities, the Attributes of those Entities, and the Relationships between the Entities in your environment. You need not be concerned about any difficulty in deciding which is which. EXSYS works perfectly if the distinctions are perfect, and will still work within wide bounds even if the distinctions are imperfect. It does not rely on fixed methods or sequences of Entity, Attribute and Relationship definition.

In practical terms, the Data Modelling process involves the designer or Administrator (usually in consulation with a variety of business analysts and end users), in describing the things with which the business is concerned, and how these things are described and related.

In many businesses, the designing of the basic Data Model will alone accomplish over half of the tasks of building a system. This is because, even though you may not see it at the time, EXSYS is gathering a vast amount of information about your Organisation in general, particularly as it asks questions about Relationships.

ATTRIBUTE DETAIL

When you have finished with the Data Modelling activity (you may have entered your entire Model or only a small part of it), you need to fill in some details about the quantities involved. This is done by describing the Form of the Attributes.

In this activity, specific details are set out for the previously non-specific Attribute names. Their shapes and forms are described in as much detail as you want. Interconnections between Attributes are also described, whereby the value of one Attribute may be derived from the value(s) of other Attributes. In so doing, "Business Rules" may be described to EXSYS, where appropriate, in the form of Conditions and Formulae.

The details entered at this stage are not then fixed for all time. They provide the EXSYS Run-time system with sensible and usable standard Type definitions, but any of these can be modified to suit for any particular Procedure that is to use them in the final system. For instance, a standard Report column heading, or Screen prompt, can be defined here, but these may be changed for any particular Report or Screen when needed.

EXSYS is able to save you much of the effort in defining Attribute details, because it has inbuilt standards or defaults to offer you. In a large percentage of cases, these defaults are completely acceptable. Thus you may be able to define the Attribute details very rapidly indeed.

PROCEDURE OVERVIEW

By the time the Data Model is fairly complete, its complexity may be considerable. The Procedure Overview is a "control point" and "initializing step" for the development of Procedures to operate on your Data Model. It serves three purposes:
1. Through the process of defining (naming) Functional Areas of the Organization, it enables a large Model to be broken down into a set of manageable portions. This facilitates further logical development of the shape of the whole system.
2. It enables the Initialisation of the standard Procedures, prior to them being defined in further detail during Procedure Modelling. EXSYS can step through all the Entities in the Model (or chose ones), and set the basic "file maintenance", enquiry and reporting Procedures required to make those Entities accessible and useful. In effect, it sets up a "user view" (or "sub-schema") around each Entity. In effect, this activity enables you to initialise many of the important Procedures in your Organization, in a systematic and consistent manner. It is not a compulsory activity, but an aid to systematic design.
3. It is a control point for the System Administrator, in respect of the following two activities:
   It is used to allocate primary responsibility for each Entity to the chosen Functional Areas of the Business. This helps to break down the complex model into simpler areas of concern.
   It is used to allocate Procedures to Functional Areas, so that the menus that end users in any particular Functional Area see and can use, will only let them perform those Procedures.

PROCEDURE MODELLING

This involves the detailing of Procedures. These Procedures may either be ones which are named and initalised at this point, or ones which have been already named in the Procedure Overview.

Procedure types which can be designed are:
Data Entry screens and the processes associated with them for Entity Creation.
Deletion screens and the processes associated with them for Entity deletion.
Reports.
Enquiry screens and the processes associated with them to display Entity deatils.
Processing, or manipulation of Attribute and Entity data, within and between Entities, which does not involve terminal or printer input or output.
Sequences or groupings of any of the above Procedures, which are to be performed sequentially subject to any Conditions which you may specify.

For each of these types of Procedures, design is done interactively with EXSYS, in a manner similar to Data Modelling, but with questions particular to the type of the Procedure. A number of activities are common to most Procedure Modelling activities.

The first basic activity (if it has not already been done in the Procedure Overview) is to gather together the Entities involved in the Procedure. From this, then, all the Attributes involved (say, to be Screen input fields, or to be printed on a Report) may be selected. The details of any of these Attributes may be changed from those set up in the Attribute Detail activity.

Then for Procedures involving Screens of Reports, layouts are designed, if the default screen or report layouts need fine-tuning.

The involvement of some Attributes may be subject to various Conditions. Some may be calculated using Formulae. Some Conditions involve Formulae, and vice versa. Thus, one frequent activity curing Procedure Modelling is the definition of Conditions and Formulae, or 'Business Rules'.

The definition of a Condition involves a simple dialogue, which can be followed to any depth, to produce potentially quite complex Conditions. Simple Formulae can also be designed by dialogue, and complex Formulae can simply be entered in standard algebraic notations, similarly to spreadsheet methods.

FORMULAE AND CONDITIONS

These may be names and detailed either during the detailing of Attributes which are derived from other Attributes, or during Procedures which use them (see the discussion in the previous paragraphs).

They may also be defined and maintained independently, if that is more convenient. Thus, 'libraries' of Conditions and Formulae may be built, especially if they can be used in more than one EXSYS procedure.

MENU DESIGN

Although menus may be designed at any stage after the Procedure Overview, in a complex system they will probably be designed last of all.

A menu has two design components. The first is the screen appearance, and the second is the specification of menu items (other menus or Procedures) to which that menu provides access.

EXSYS provides default menus as a direct result of the activity in the Procedure Overview. Once Functional Areas are defined, each has a default Menu defined, which contains all the Procedures accessible to that Functional Area. As new Procedures are defined and assigned to Functional Areas, this Menu automatically grows. When it gets too large, the designer can modify its design by splitting it into sub-menus, and creating a parent Menu to give access to them.

SECTION 2

EXSYS began where everyone else begins, that is as a systems analyst working from two works which are standard in Data Processing.

"Information Engineering" by Finkelstein and Martin

"Data Base Theory" by C. J. Date.

These works detail the approach by conventional pre-EXSYS analysts. They would proceed logically along accepted interrogation pathways using check lists to make sure the questions left no gaps and if they stumbled across an area which needed indepth questioning they exhausted this area before moving on to the next. If others were tackling other parts then it would take endless questioning to arrive at the systems diagram which is a number of boxes linked by relationship lines. But at best only a data model, not necessarily a Procedure model would result. The contribution of this invention is to enable a tape to be prepared containing questions and instructions which enable the laborious checking work to be conducted on the computer. Much work centers around questions. All questions must be expressed with a precision of expression which leaves no room for ambiguity, which preferably require a yes or no answer but which ask about a single incidence, for example:

"Can a book have more than one borrower?" must be changed to:

"Can a book have more than one borrower at any one time"?

In practice the information gathering proceeds in two phases. Firstly, EXSYS asks the user about the information. Secondly, EXSYS asks itself about the information. We give the analogy that if the user describes cars in lanes crossing an obstacle, EXSYS will suggest a number of parallel spans defining lanes and as soon as the customer mentions tidal flow, EXSYS will anticipate that structure to indicate which lanes operate in which direction will be mentioned sooner or later and sketches it in. Similarly if the user changes his mind, EXSYS will delete that part of the structure without disturbing the remainder. EXSYS is able to deal with contrary data. This is not an insurmountable problem if one ensures that the Attributes and Entities are all defined so as to be unique. Thus, the major part of the information gathering centers around establishing the relationships which are expressed in numbers, letters, and words. Thus "customer has customer ID" is stored as three pieces of binary. The relationship is fixed in both directions.

1. Naming an entity
The display screen reads:
"Entity name: ....................
Entity Description: ...................."

The system then asks whether a repeating group is being created and then moves on to identification of the entity.

2. Identifying the Entity
On the screen is displayed:
"How many Attributes are required to uniquely identify this Entity 1."

Next a screen is displayed for the number of Attributes necessary to complete the identification. Should the identifying Attributes of a new Entity be identifying Attributes of another entity the system will assume that there is a relationship between these entities and will invite the user to define it after all the identifying Attributes are entered.

| NAMING AN IDENTIFYING ATTRIBUTE | |
|---|---|
| Name of identifying Attribute: | Entity I.D. |
| Attribute description: | ———— |

If the Attribute is an identifying Attribute of another Entity no description is requested. The system will deduce a relationship between the two entities. A screen is then presented as follows:

"Do the Attributes
ATTRIBUTE 1
ATTRIBUTE 2
ATTRIBUTE N
together comprise a meaningful generic name in your Organization (e.g. 'Complete ENTITY ID'): N"

If the user answers yes then a composite Attribute will be created. The screen then displays:

"Enter the equivalent name:
Complete ENTITY ID ——————"

The system may deduce that there are some relationships to be defined. The user is asked whether they wish to do so at this stage. The user may elect not to do so and he can define the relationship at a later stage. The screen then displays:

"Do you wish to describe further Attributes of this Entity N"

The system then asks whether a repeating group is being created and then moves on to identification of the entity.

The entity definition is now complete and the procedure may be repeated for a new entity.

REPEATING GROUPS

A Repeating Group is an Attribute (or more commonly a group of Attributes) recurring more than once in an Entity.

A Repeating Group of an Entity has for example a relationship to its "parent" Entity.

In one instance a company may have several branches and this branch is described as a Repeating Group. The system will then deduce that there is a relationship between company and branch. These Entities cannot exist by themselves, they must have at least one attribute. Similarly Attributes can only be associated with an Entity never can have a life of its own.

Each of the terms referred to in this illustration are used according to CODASYL standards.

Relationships between Entities.

Certain relationships between Entities are deduced by the system as soon as the Entity names are entered, For example during the creation of repeating groups, using an identifying Attribute of one Entity which turns out to be the identifying Attribute of another Entity, using an Attribute name in relation to one Entity which has been used in the Attribute definition of another Entity.

EXAMPLE A

During Attribute Description of Entity COMPANY (Identifying Attribute COMPANY ID) a Repeating Groups BRANCH (COMPANY ID and BRANCH ID) was defined.

Since the system deduced the existence of a relationship, the names of the Entities involved were already known (and therefore were not asked for).

EXAMPLE B

Having defined Entities CUSTOMER (CUSTOMER ID) and ORDER (ORDER IC), it was necessary to define a relationship between them which indicated that one customer could place many orders, but an order must have been placed by one customer. The Entity names were not known to the system.

EXAMPLE C

An Entity ACCOUNT (ACCOUNT NUMBER) was defined and a relationship between it and CUSTOMER (as in example B) required in the following form: One customer may have one account and an account must be held by one customer. The Entity names were therefore not known to the system.

Determining whether the relationship is many-to-many

The screen displays:

"In the context of the relationship being defined are both of the following true?"
 (1) There may be more than one ENTITY 2 for each ENTITY 1 AND
 (2) There may be more than one ENTITY 1 for each ENTITY 2.

Y or N

If the reply is Yes then a many-to-many relationship is required, othewise it is one-to-one or one-to-many.

The relationship is named in both directions between the Entities. The screen displays:

---
"Enter text to fill the gap between Entities written in order"
ENTITY 1 ... ENTITY 2
---

The user types in a clause linking the two words eg:

---
COMPANY ... BRANCH
COMPRISES
---

The question is then repeated in the reverse order which produces a reply:

---
BRANCH ... COMPANY
IS PART OF
---

DETAIL OF THE RELATIONSHIP

Two types of questions are asked whether the relationship is one-to-one or one-to-many (in both directions) and whether it is mandatory or optional. Where the system has deduced the need for a relationship, some of this information may already be known in which case the number of questions will be reduced.

Thus the following questions may be displayed on screen:

Section Titles (with Sample numbers to indicate classification)

6.1 Obtaining Names of Entities Involved
6.2 Defining the Relationship
  6.2.1 Determining whether the Relationship is many-to many
  6.2.2. Naming the Relationship
  6.2.3 One-to-one and one-to-many Relationships
    6.2.3.1 Detail of Relationship
    6.2.3.2 Determining the Access Path
    6.2.3.3 Check for Existence of Relational Attribute
    6.2.3.4 Naming the Relational Attribute
  6.2.4 Many-to-many Relationships
    6.2.4.1 Choosing the Type of Association Entity
    6.2.4.2 Creation of a Simple Association Entity
    6.2.4.3 Creation of "Real Life" Association Entity
  6.2.5 Relationships between an Entity and Itself.

ESTABLISHMENT OF ACCESS PATH

The system must have some physical connection between Entities in order to determine which Instance of ENTITY 1 is associated with which Instance of ENTITY 2 (and/or vica versa). The system deduces whether a Relational Attribute (an Attribute which provides the Access Path in the Relationship) needs to be added to one or both of the Entities.

In the case of one-to-many relationships, a Relational Attribute needs to be present in the "many" Entity. The system checks to see if there is already such an Attribute present. For a one-to-one relationship it is possible to have pathways between the Entities in both directions and therefore Relational Attributes may be necessary in both Entities.

CHECKS FOR EXISTENCE OF RELATIONAL ATTRIBUTES

In the case of one-to-one and one-to-many relationships an Attribute must be present in one or both of the Entities in order to indicate which instances of each Entity are to be associated. If the system has deduced the need for a Relational Attribute the system asks if there is such an Attribute in existence. The screen displays:

---
"Is there an Attribute ALREADY attributed to ENTITY 2 which describer ENTITY 1 that
RELATION 1    ENTITY 2    Y or N."
---

If "Y" then the appropriate Attribute name is requested and, if it exists within ENTITY 21, this section is completed.

If "N" then an Attribute must be created in ENTITY 2 when the relationship is one-to-many. If not (it is one-to-one) the pathway connecting the Entities may not be required and so a further question is asked.

"Do you want to create an Attribute which indicates the ENTITY (½) which RELATION ½ each ENTITY (2/1) Y."

MANY-TO-MANY RELATIONSHIPS

If the relationship between the two Entities is many-to-many ("Y" response in 6.2.1) a new Entity, called an Association Entity, is created by the system to record every association of the Instances of the Entity pairing.

This new Entity can be created in one of two forms: either to represent a "real" quantity which links ENTITY 1 and ENTITY 2 and contains other useful information about the connection between them, or as a simple device to enable EXSYS to record the links between Instances of the Entities.

First of all, however, some details about the Relationship must be established, as in the case of one-to-one and one-to-many relationships (which are described in Chapter 6.2.3). The same questions are asked as in 6.2.3.1, except that, since the relationship has been defined to be many-to-many, the first two questions are not asked.

EXAMPLE

The following interaction takes place

```
"In the context of this relationship can a TEACHER
                                  exist without an associated
                                  STUDENT Y
In the context of this relationship can a STUDENT
                                  exist without an associated
                                  TEACHER N."
```

DATA MODELLING

This service depends upon the provision by the user of a list of all the bits of information concerning the user's organization and activities and the relationship between them. The questions and answers abour Entities, Attributes and Mutual Relationships establish the framework of the organisation whereas use of the system for Data Modelling requires considerably more detail.

Provision of detail is made by posing further questions concerning the form of the Attributes so far assembled. The system offers a choice of Attributes to the user for augmenting the Attribute description. They are:

```
"Possible Attribute Types
  1.   Numeric (1 through 9 only)
  2.   Numeric codes
  3.   Monetary Values (Decimal Currencies Only)
  4.   Alphabetic (A through Z only)
  5.   Alphanumeric (Numeric, Alphabetic or Special
       Characters)
  6.   Date
  7.   Time
  8.   Specific Values
What type is Attribute 1".
```

Coupled with this provision of detail is the facility of electing whether the data appears left or right justified that is whether the information begins at the left most column and finishes before or at the right most column or vice versa.

The value of the system lies in its ability to deliver procedures, namely, series of events and conditions which, when executed, perform a task for example executing a check on whether a customer's credit has been exceeded.

EXAMPLES

Include an Attribute in a Report only if its value is greater than a certain minimum value;

Check on the validity of a value input into a Data Entry screen if the value of an associated Attribute has been previously entered;

Only include a term in a formula evaluation if it has a non-negative value;

Print a Report if there are 30 days in this month.

We have found the advantages of this system to be that it is assists in the development of a system specification but at the end of this stage the user has an operational system. It resembles prototype system but it is not a true prototype system in that stages 2 and 3 are eliminated. Stage 4 is drastically reduced because many errors which are inevitable in the conventional type of system cannot occur. Errors do arise but these are typically of a minor nature.

SECTION 3

OVERVIEW

Builds from user names and subsequent questions back to user a data model of the organisation - a conceptual structure of entities, attributes and relationships.

1. Mimics systems analyst by asking questions to
   (a) analyze the answers user has given, to produce alternative design structures
   (b) investigate the alternatives further to see which is the one most appropriate to the user's requirements
   (c) obtains confirmation from user on answers which cause particular alternatives to be decided on
   (d) create internally stored tables of information concerning the established design structures —the entities their attributes, and how they are related to each other, details stored in such a form that design of screens and reports can be performed automatically, knowing the entities, attributes and relationships involved.
   (e) check every new entity and attribute name against all other such names already defined and stored internally, to see if patterns exist which suggest further relationships in the data model
   (f) investigate particular standard database situations and structures (e.g. Many: many Repeating Groups, mandatory relationships, sub-groups) by asking user questions to establish requirements and optional Design Module structure.

2. Allows user to indicate a desire to change an existing model, at any stage in its development, and
   (a) presents a report of all the implications of the change (in terms of the other model changes it would require to maintain an integrated model) to enable the user to decide whether or not to proceed,
   (b) if the user wants to proceed, performs the change and changes every other part of the model to the degree required to maintain consistency between all model entities, attributes, relationships and other system components.

3. Allows user to obtain printout of all Model details ..., together with a diagram of the entities and inter-relationships.

SPECIFICS

1. Allows user the name entities, attributes and relationships in natural English with no restrictions on word usage.
2. Mimics the systems analyst in the investigations of the method of identification of entities, by asking questions about identifying attributes, to ensure that the method entered by the designer provides for uniqueness and eliminates redundant identifiers.
3. Checks the names entered for identifying attributes of a new entity against all identifying attributes of all other entities, and if a pattern is found, requests the user to create consistency by either answering further questions about the relationships between the entities involved or re-defining the identification of the new entity.
4. Checks all newly entered entity and attribute names against all previously entered entity and attribute names, and if partial matches formed, asks designer if a relationship between the involved names is implied and should be defined. If so, asks questions to create the definition, and if not, allows designer to proceed.
5. Mimics the systems analyst by asking 3 basic questions about each newly defined attribute name, to see if it requires special treatment. If it does not, the name is stored in a table in such form that, in a final running system, data will be able to be stored about its values in a database. If it does, the mimicing of the systems analyst continues with further questions to see if special Model structures are required.
6. Investigates if a new attribute is a Repeating Group, by asking a series of questions, the order and content being automatically determined by the answers to the previous questions. If in the end the pattern of answers indicates that a Repeating Group is not the optimum method for the design of the model, reverts to a simple attribute definition. If a Repeating Group is required, obtains name and identification of the Repeating Group from the user, and obtains by questions the details of the implied relationship between the patent entity and the Repeating Group.
7. Obtains names for relationships between any 2 entities as requested by the designer, to create language text concerning how the entities interact with each other.
8. Mimics the systems analyst by asking, in refined form, whether the relationship is optional or mandatory, and to one or to many, in both directions (1st entity to second and vice versa).

DEFINITIONS

ENTITY: Thing in the organization about which information is to be stored. Corresponds in conventional data processing to 'files and records'.
ATTRIBUTE: Single property of an entity. Corresponds in conventional data processing to "field".
RELATIONSHIP: Way in which two entities interact. There is no explicit corresponding data processing classification. The nearest to it would be another file.
IDENTIFYING ATTRIBUTE: Particular kind of attribute used by user to identify uniquely a particular instance or occurrence of an entity. In conventional data processing this is a key or index of the file eg: an order number for an order or a person's income tax number.

Now follow examples of the entries in the internal tables which store information about the data model.

| | | Example Contents |
|---|---|---|
| A. | Entity | |
| | ID | 006 |
| | Name | Customer |
| | Description | Ordinary Retail Buyer |
| | Number of Identifying Attributes | 2 |
| | Number of Instances (if "live") | — |
| | Number of non-composite Attributes | 23 |
| | Number of Composite Attributes | 2 |
| | Number of procedures it's in | 12 |
| | Type | B |
| | Subgroup (or not) | — |
| | Association Relationship ID | 2 |
| | Number of Fields in Data Record | 23 |
| B. | Attributes | |
| | ID | 0047 |
| | Name | Customer Address |
| | Description | Home Address of Customer |
| | Floating Point or not | — |
| | Type | N |
| | Maximum length | 40 |
| | Maximum value | — |
| | Minimum value | — |
| | Input Edit Mask | — |
| | Output Picture | — |
| | Prompt | Customer Address: |
| | Number of Entities it's in | 1 |
| | Composite or not | N |
| | (+36 others describing its details). | |
| C. | Relationships | |
| | ID | 0014 |
| | 1st entity | Customer |
| | 2nd entity | Credit Rating |
| | Forward name | is assigned |
| | Reverse name | is assigned to |
| | First 1 or many | 1 |
| | First optional or mandatory | O |
| | Second 1 or many | M |
| | Attribute in first entity | 0017 |
| | Attribute in second entity | — |
| | Type | R |
| | Association entity | — |
| D. | Entity - Attribute | |
| | Entity | 004 |
| | Attribute | 0026 |
| | Position in the entity | 3 |
| | Type (Identifying or not) | N |
| | Order in the entity | 5 |
| | Order of identifying attribute | — |

Entity-Attribute is the relationship file between entity and attribute utilised in the system of the invention.

The information for these tables was established as follows:

ENTITY

There are two methods of establishing entities for inclusion in the data model:

(1) Directly: In this mode the user identifies

| NAME | CUSTOMER |
|---|---|
| DESCRIPTION | PERSON WHO BUYS GOODS FROM US |
| IDENTIFICATION | 1. HOW MANY IDENTIFYING ATTRIBUTES |

Further Questions follow to find out all the identifying attributes of the named entity. During this sequence the user's responses cause conventional analyst queries eg: "Do any two customers have the same customer ID?". If the checks run by the CPU of the data processing machine reveal overlap then a query is put to the user concerning redundancy of some of the entries. During this direct mode the system just accepts data with the minimum checks because at this early stage the system examines the user. At a later stage the system examines itself for consistency. It is standard practice to store data temporarily until such time as the user confirms that no further changes are to be made to that data whereupon it is allocated a table in the main memory. At that stage the system begins to check the content of that table against all other tables in the memory.

The system looks for:
(a) Duplication of identifying attributes
(b) A new entity name in any attributes of any other entity. The existence of a shared word in any entry implies a relationship which deserves further investigation. As the system accepts ordinary conversational words as entries, the system is arranged to cope with multiple meanings of words which might produce an accidental equality without equality in meaning eg: the user may employ the word "charge" which might be mentioned in a technical, financial or legal context. Again the system reacts by posing a series of ordinary analyst questions arranged to elicit yes or no answers by which the overlap is clarified. If the system finds two entities defined in identical terms it will establish an entity sub-group structure.

Now follows a table after the user has defined customer entity with one identifying attribute, namely customer ID:

| E. Entity | |
|---|---|
| ID | 001 |
| Name | Customer |
| Description | Customer |
| No. Identifying Attributes | 1 |
| No. of non-composites | 1 |
| No. of composites | 0 |
| No. of procedures | 0 |
| Type | B |
| (others are blank). | |
| Attribute | |
| ID | 0001 |
| Name | Customer ID |
| Description | Unique ID for customer |
| Type | N |
| No. of entities | 1 |
| (others are blank) | |

The system contains an instruction to form an additional table for the purpose of unequivocal definition without the knowledge of the user.

| Entity-Attribute | |
|---|---|
| Entity | 001 |
| Attribute | 0001 |
| Position | — |
| Type | K |
| Order | 1 |
| Order of ID | 1 |

(2) Indirectly: In this mode the system discusses the definition which is necessary.
(i) During a relationship definition, the relationship may be Many:Many which is very common eg: an order for goods may contain many product items and any one of those product items can occur in many different orders.
(ii) During an attribute definition then standard analytical questions are asked concerning the nature of the attribute and if these all receive the answer "YES" that exhausts the ways in which the entity being identified can be defined.

Attribute Definition

1. Direct

User chooses the extra attributes via a standard sequence eg:

| NAME | CUSTOMER OVERDUE | PAYMENT |
|---|---|---|
| DESCRIPTION | CUSTOMER OVERDUE? | PAYMENT |

This question expects the answer Yes or No. There are three standard analyst queries for each attribute.
(a) Can there by more than one of the attribute for each entity?eg: more than one address for each customer? If Yes then a major query sequence will follow which will result in the definition of perhaps a special entity for example a repeating group.
(b) Can the attribute have a limited set of values?eg: customer credit rating A,B,C or D? If the answer is Yes then a major query sequence follows in order to elucidate the circumstances in which the customer might receive different credit ratings at any one time.
(c) Can the attribute have attributes of its own? A Yes response to this question is rare but again initiates a query sequence which clarifies the definition. The system checks all these responses as they are stored and continues to look for words common to two or more entries and give the option of defining the relationship between them if one exists.

2. Indirect:
During a relationship definition of:
MANY:ONE
the entity concerned has to have an attribute to say which of the other entities it is related to. In convention data processing this is called a foreign key. The system is arranged to define this automatically. Reverting to the tables set out above, after the user adds the attribute "customer name" the tables are amended as follows:

| Entity | Attribute | | |
|---|---|---|---|
| As above, except | ID | 001 | 002 |
| No. non-composites = 2 | Name | Cust. ID | Cust. Name |
| | Disc | Unique ID for Cust. | Name of Cust. |
| | No. of entities | 1 | 1 |

Simultaneously the entity-attribute table is amended by the addition of an extra column as shown below:

| Entity-Attribute | | |
|---|---|---|
| Entity | 001 | 001 |
| Attribute | 0001 | 0002 |
| Position | — | — |
| Type | K | D |
| Order | 1 | 2 |
| Order of ID | 1 | — |

RELATIONSHIP DEFINITION

The space in the memory accorded to these definitions is commonly several times bigger than the space reserved for entity and attribute tables. Again the modes are:
1. Direct Here the user chooses by indication on a menu containing these questions:
(i) Name of relationship eg: the user might link branch and company by adding words to form the following sentence: Company comprises branches.
(ii) Does each have more than one of the other?
Is that over a period of time?
Is that at any one particular time?
(iii) If each must have one or the other?

That is to say, is the relationship mandatory or optional? The system checks that certain combinations are valid eg: if each is mandatory for the other. Further questions may be asked of the user in order to avoid dilemma. This avoids attempts to define relationships where only one of a pair of entities has been so far defined eg: if employees must belong to a particular department and no such department has yet been defined, further questions must precede the attempt to establish a relationship definition.

After adding the entity "Credit Rating" with the identifying attribute "Credit Rating Code" and relating it to "Customer" the system sets up the relationtional attribute "Customer Credit Rating" (foreign key) in the customer table.

| Relationship | | |
|---|---|---|
| ID | 0001 | |
| 1st Entity | 001 | |
| 2nd Entity | 002 | |
| Forward Name | has | |
| Reverse Name | is assigned to | |
| 1st 1/Many | N | |
| 1st Opt/Mand | O | |
| 2nd 1/Many | 1 | |
| 2nd Opt/Mand | M | |
| Attributes in 1st | 0004 | |
| Attributes in 2nd | — | |
| Type | R | |
| Entity | | |
| ID | 001 | 002 |
| Name | Customer | Credit Rating |
| Disc | Customer | Credit Rating Table |
| No. Identifying Attributes | 1 | 1 |
| No. Instances | — | — |
| No. Non-composites | 3 | 1 |
| No. composites | 0 | 0 |
| Type | B | R |

This causes expansion of the attribute table as shown below:

| Attribute | | | | |
|---|---|---|---|---|
| ID | 0001 | 0002 | 0003 | 0004 |
| Name | Cust. ID | Cust. Name | Credit Rating Code | Cust. Credit Rating |
| Disc | Unique ID for Cust. | Name of Cust. | Unique ID for Credit Rating | Cust. Credit Rating |
| Type | N | N | N | N |
| No. of Entities | 1 | 1 | 1 | 1 |

In practice this attribute table might have several hundred side by side columns. The expansion of the attributes causes a concurrent expansion of the entity-attribute table as shown below:

| Entity-Attribute | | | | |
|---|---|---|---|---|
| Entity | 001 | 001 | 001 | 002 |
| Attribute | 0001 | 0002 | 0004 | 0003 |

-continued

| | | | | |
|---|---|---|---|---|
| Position | — | — | — | — |
| Type | K | D | D | K |
| Order | 1 | 2 | 3 | 1 |
| Order of ID | 1 | — | — | 1 |
| Relationship | | | | |
| ID | 0001 | | | |
| 1st Entity | 001 | | | |
| 2nd Entity | 002 | | | |
| Forward Name | has | | | |
| Reverse Name | is assigned to | | | |
| 1st 1/Many | N | | | |
| 1st Opt/Mand | O | | | |
| 2nd 1/Many | 1 | | | |
| 2nd Opt/Mand | M | | | |
| Attributes in 1st | 0004 | | | |
| Attributes in 2nd | — | | | |
| Type | R | | | |

Thus the relationship is expressed in the forward direction in the table as:
"Customer has credit rating"
And in the reverse direction as:
"Credit rating is assigned to customer".
The remaining entries identify the entities concerned in the relationship, what type the relationship is in both directions, and whether it is optional or mandatory.

Figure 1B:
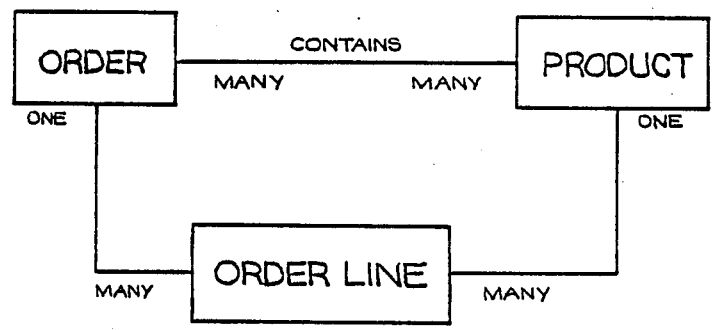

If the relationship is MANY:MANY a major query sequence may be necessary to illucidate. It may be necessary to expand the presentation of the information and it is shown in FIG. 1 how the MANY:MANY relationship between a goods order and a product item is resolved by the creation of a new entity and three new relationships instead of one.

Figure 2:
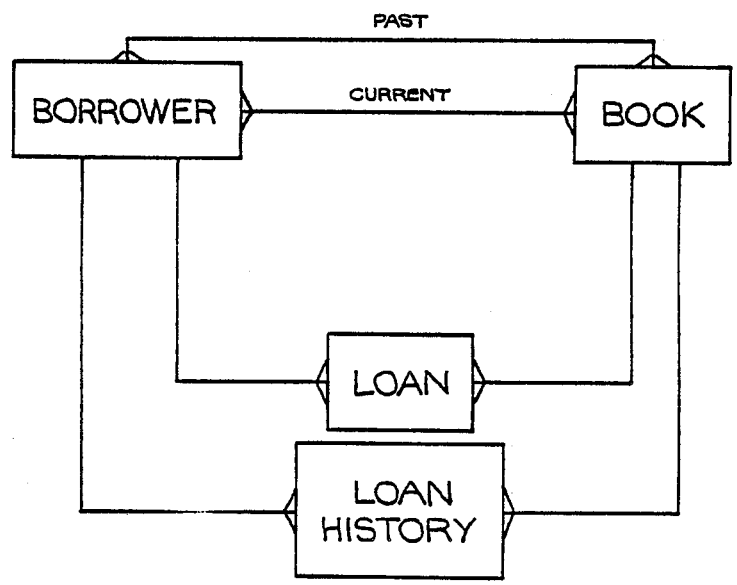
Figure 3:
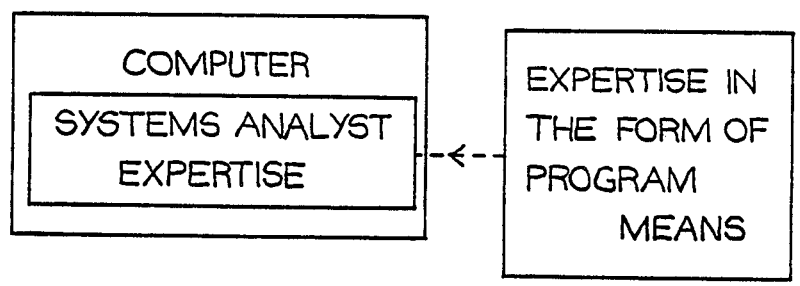
FIGS. 3 and 4 illustrate an embodiment having the features mentioned in the appended claims.
Figure 4:
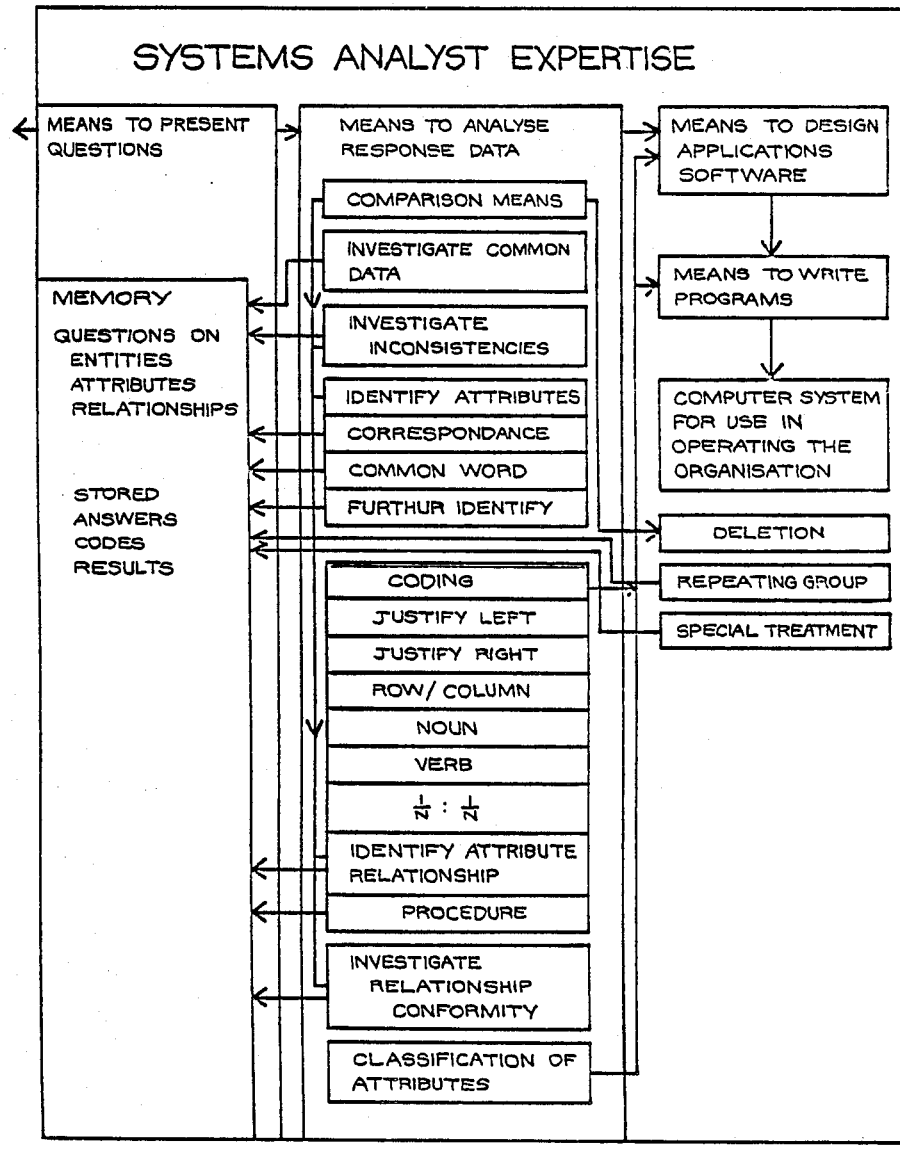

In another example illustrated in FIG. 2 we see the relationship between book and borrower expressed comprehensively by the introduction of the entity "Loan" and the entity "Loan History". The advantage of arranging the system to add extra definition appears when the user wishes to amend an existing model by deletion of part thereof. The system reacts by cancelling associated entries thereby leaving no loose ends eg: in FIG. 2 if the user wished to delete "Loan History" the system would cancel all the dependent relationships. If instead the user deleted "Book", The system would delete all except borrower. Therefore during amendment the system is arranged to check all the tables, state to the user the implications of his amendment and asks the user if he wants to proceed with the amendment.

1. Example of how EXSYS spots an inconsistency and reacts to it:

If the Designer has defined two separate entities (one was defined in the past, the second is being defined "now") which have exactly the same identifying attributes, EXSYS asks:

"Which of the following is true,
1. (Entity A) are a sub-group of (Entity B)
2. (Entity B) are a sub-group of (Entity A)
3. They are BOTH sub-groups of a single other Entity
4. NONE of the above".

If the Designer answers "4", EXSYS says:
"Then you should examine this carefully. You have described two apparently UNRELATED Entities which are identified by the SAME Identifying Attributes. (One possibility is that the two Entities should be MERGED into one Entity).
Do you want to:
1. Delete the Entity
2. Accept that the Entities are related, and proceed 3. Change your answer to the above question".

2. Example of how extra relationships are added by EXSYS automatically between two Entities:

If the Designer is in the process of defining "Many-to-Many" Relationships (between two "parent" Entities), EXSYS sets up an "Association Entity", as the theoretically correct and required method of copying with this. Relationships between each of the "parents" and the Association Entity are automatically created by EXSYS, because otherwise this part of the Data Model would be inconsistent with the rules of correct relational database design.

We claim:

1. A method of constructing a data model of an organizational structure and the operation thereof which comprises the stages of analysing data provided by the customer organization (analysis), designing application software (procedure design), writing programs which collectively enable control of the operating procedures of the organization (programming) and testing the individual programs characterized by performing the stage of analysis with a data processing machine, wherein the analysis stage comprises:

storing in memory of the machine a source series of questions which are presentable in conversational language concerning the entities in the organizational structure, the attributes of those entities, and the relationship between the entities; and constructing a data model from the answers.

2. A method as claimed in claim 1 wherein the stage of procedure design is conducted on a data processing machine without human intervention.

3. A method as claimed in claim 2 wherein the stage of programming is conducted on a data processing machine.

4. A method a claimed in claim 1 including storing in the memory of the machine in coded form a first answer to a first question, comparing every subsequent answer with at least some of the previous answers and in the event of finding data common to two answers, presenting questions in conversational English which investigate the connections if any, between the two answers.

5. A method as claimed in claim 4 including the step of presenting questions which offer to the user an opportunity to change an answer which is inconsistent with a previous answer or to add data establishing a link with a consistent answer already given.

6. A method of constructing a data model as claimed in claim 5 including the further step of comparing each identifying attribute entered by the user with all previously entered identifying attributes and if correspondence is discovered questioning the user in order to re-define the attribute until the attribute is rendered unique.

7. A method of constructing a data model as claimed in claim 6 including the further step of comparing each attribute entered by the user with all previously entered attributes and upon finding a word in common, questioning the user whether the two attributes are relatable.

8. A method of constructing a data model as claimed in claim 7 including the further steps of determining the nature of the attribute by asking;

1. Can there be more than one attribute for each entity?
2. Can the attribute have a limited set of values?
3. Can the attribute have an attribute of its own?

and in response to the answers provided by the user either entering the attribute in a table in the memory containing spaces for the reception of subsequent qualifying information or presenting further questions to determine the precise nature of the attribute.

9. A method of constructing a data model as claimed in claim 1 including the further step of comparing each identifying attribute entered by the user with all previously entered identifying attributes and if correspondence is discovered, questioning the user in order to re-define the attribute until the attribute is rendered unique.

10. A method a constructing a data model as claimed in claim 1 including the further step of comparing each attribute entered by the user with all previously entered attributes and upon finding a word in common, questioning the user whether the two attributes are relatable.

11. A method of constructing a data model as claimed in claim 1 including the further steps of determining the nature of the attribute by asking;

1. Can there be more than one attribute for each entity?
2. Can the attribute have a limited set of values?
3. Can the attribute have an attribute of its own?

and in response to the answers provided by the user either entering the attribute in a table in the memory containing spaces for the reception of subsequent qualifying information or presenting further questions to determine the precise nature of the attribute.

12. A method of constructing a procedure of an organizational structure and the operation thereof comprising: performing the stages of analysis and procedure design for a data model with a data processing machine including rendering information automatically includable in the procedure design stage of a computer system generator, and storing information obtained from the analysis and design stages in the memory of a data processing machine.

13. A method of constructing a data model as claimed in claim 1, wherein the analysis stage comprises investigating whether a new attribute is a repeating group, whether treatment of it as a repeating group is optimum to the design of the model, if so presenting questions to elicit the relationship between the repeating group and its parent entity, if not, reverting to a simple attribute definition.

14. A method of constructing a data model as claimed in claim 1, in which upon a modification or deletion in the data model outdated said data and procedures are correspondingly and automatically modified or deleted.

15. A method of constructing a data model of an organizational structure for a user, utilising a digital or analogue computer system comprising:

(a) storing in a main memory of a computer system a source series of questions which are presentable in conversational language concerning the entities represented in the organizational structure and operation thereof, the attributes of those entities, the relationship between those entities, (b) storing in the memory in coded form a series of answers in conversational language which are provided by the user to the series of questions which answers in coded form constitute data for the model, (c) comparing the coded form of answers with coded data in the main memory, (d) analysing the comparisons and compiling a data model for the user from the comparisons in the data.

16. A method of claimed in claim 15 wherein certain entities receive a code which identifies them as left justified entities so that upon display they will be justified to the left hand side of a display screen.

17. A method as claimed in claim 15 wherein certain entities receive a code which identifies them as right justified entities so that upon display they will be justified to the right hand side of a display screen.

18. A method as claimed in claim 15 wherein each entity is accorded a code indicating whether it is to be displayed on a display screen as a column or as a row.

19. A method as claimed in claim 15 wherein those of the questions concerning entities are constructed to elicit nouns as answers whereafter the noun is accorded a code.

20. A method as claimed in claim 15 wherein those of the questions concerning relationships are constructed to elicit verbs as answers whereafter the verb is accorded a code.

21. A method as claimed in claim 15 wherein a code corresponding to a user's answer is allocated in one direction and in the opposite direction to describe the relationship between two entities as one of the following:
   One:One
   Many:One
   One:Many
   Many:Many 22. A method as claimed in claim 15 wherein a comparison is made between codes stored in the memory concerning the entities and their attributes with codes stored in the memory concerning the relationships and if necessary supplementary questions are asked about any of the following:
   (a) creation of entities;
   (b) deletion of entities;
   (c) modification of the definition of entities;
   (d) display of entities; or
   (e) listing of entities.

23. A method as claimed in claim 15 wherein for a model of a procedure in the organization, the entities concerned in that procedure are identified by reference to codes stored in the memory, the relationships between these entities are compared with standard types of relationship stored in the memory and a suitable procedure is displayed for the user's inspection of choice.

24. A method as claimed in claim 15 wherein when a relationship between two entities has been expressed and a subsequent relationship between the same two entities is expressed by subsequent question and answer, a comparison is made between the two relationships in order to test their conformity and in the event that disconfirmity is noted a check procedure concerning the truth of at least one of the relationships is initiated.

25. A method as claimed in claim 15 wherein the attributes are classified as:
   1. numeric
   2. numeric code
   3. monetary values
   4. alphabetic
   5. alphanumeric
   6. date
   7. time
   8. specific values 26. A method of constructing a procedure model for a user, utilising a digital or analogue computer system comprising:
   (a) storing in a main memory of a computer system a source series of questions which are presentable in conversational language concerning the entities represented in the organisational structure and operation thereof, the attributes of those entities, the relationship between those entities,
   (b) storing in the memory in coded form a series of answers in conversational language which are provided by the user to the series of questions which answers in coded form constitute data for the model,
   (c) comparing the coded form of answers with coded data in the main memory,
   (d) analyzing the comparisons and compiling a procedure model for the user from the comparisons in the data.

* * * * *